(12) United States Patent
Chen et al.

(10) Patent No.: US 12,610,322 B2
(45) Date of Patent: Apr. 21, 2026

(54) METHOD AND APPARATUS FOR REPEATER GAIN CONTROL FOR DEVICE COLLABORATION IN DISTRIBUTED MULTIPLE-INPUT MULTIPLE-OUTPUT SYSTEMS

(71) Applicant: MediaTek Inc., Hsinchu City (TW)

(72) Inventors: Kuan-Yuan Chen, Hsinchu City (TW); Lung-Sheng Tsai, Hsinchu City (TW)

(73) Assignee: MediaTek Inc., Hsinchu City (TW)

( * ) Notice: Subject to any disclaimer, the term of this patent is extended or adjusted under 35 U.S.C. 154(b) by 330 days.

(21) Appl. No.: 18/391,545

(22) Filed: Dec. 20, 2023

(65) Prior Publication Data

US 2024/0244534 A1 Jul. 18, 2024

Related U.S. Application Data

(60) Provisional application No. 63/480,322, filed on Jan. 18, 2023.

(51) Int. Cl.
| | |
|---|---|
| *H04W 52/02* | (2009.01) |
| *H04W 52/14* | (2009.01) |
| *H04W 52/24* | (2009.01) |
| *H04W 52/36* | (2009.01) |

(52) U.S. Cl.
CPC ....... *H04W 52/146* (2013.01); *H04W 52/242* (2013.01); *H04W 52/36* (2013.01)

(58) Field of Classification Search
CPC ..... H04L 43/062; H04L 5/006; H04B 7/0695; H04B 7/0617; H04W 52/146; H04W 52/242; H04W 52/36; H04W 72/10; H04W 72/046
See application file for complete search history.

(56) References Cited

U.S. PATENT DOCUMENTS

| | | | | |
|---|---|---|---|---|
| 12,349,074 B2 * | 7/2025 | Fodor | ................. | H04W 52/383 |
| 2019/0074879 A1 * | 3/2019 | Furuskog | ............ | H04W 72/046 |

* cited by examiner

*Primary Examiner* — Phuoc H Doan
(74) *Attorney, Agent, or Firm* — Andy M. Han; Han IP PLLC

(57) ABSTRACT

Examples pertaining to repeater gain control for device collaboration in distributed MIMO systems are described. An apparatus (e.g., a repeater) may determine a first compensation value for a first path loss on a first link between the apparatus and a UE, and determine a second compensation value for a second path loss on a second link between the apparatus and a network node of a wireless network. The apparatus may also determine a repeater gain for uplink power control according to the first compensation value and the second compensation value. The apparatus may further forward a radio signal from the UE to the network node according to the repeater gain.

20 Claims, 4 Drawing Sheets

400

DETERMINE, BY A PROCESSOR OF AN APPARATUS, A FIRST COMPENSATION VALUE FOR A FIRST PATH LOSS ON A FIRST LINK BETWEEN THE APPARATUS AND A UE
410

DETERMINE, BY THE PROCESSOR, A SECOND COMPENSATION VALUE FOR A SECOND PATH LOSS ON A SECOND LINK BETWEEN THE APPARATUS AND A NETWORK NODE OF A WIRELESS NETWORK
420

DETERMINE, BY THE PROCESSOR, A REPEATER GAIN FOR UPLINK POWER CONTROL ACCORDING TO THE FIRST COMPENSATION VALUE AND THE SECOND COMPENSATION VALUE
430

FORWARD, BY THE PROCESSOR, A RADIO SIGNAL FROM THE UE TO THE NETWORK NODE ACCORDING TO THE REPEATER GAIN
440

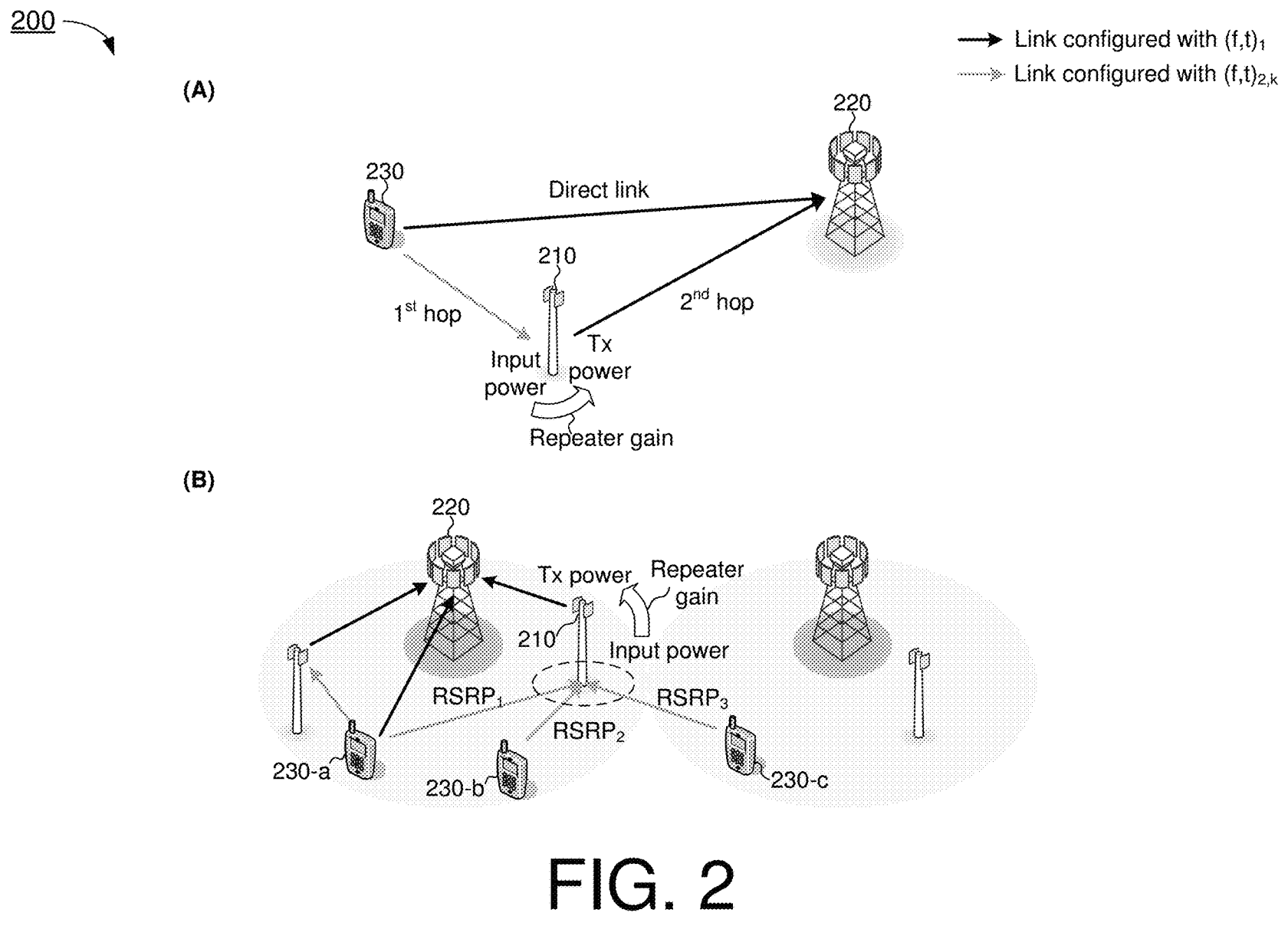

200

Link configured with $(f,t)_1$

Link configured with $(f,t)_{2,k}$ (A)

220

Direct link $2^{nd}$ hop

210

Tx power

Input power

Input power

Repeater gain

230

$1^{st}$ hop (B)

220

Tx power

Repeater gain

210

Input power

RSRP$_1$

RSRP$_2$

RSRP$_3$ 230-a 230-b 230-c

FIG. 2

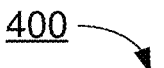

400

---

DETERMINE, BY A PROCESSOR OF AN APPARATUS, A FIRST COMPENSATION VALUE FOR A FIRST PATH LOSS ON A FIRST LINK BETWEEN THE APPARATUS AND A UE
410

---

DETERMINE, BY THE PROCESSOR, A SECOND COMPENSATION VALUE FOR A SECOND PATH LOSS ON A SECOND LINK BETWEEN THE APPARATUS AND A NETWORK NODE OF A WIRELESS NETWORK
420

---

DETERMINE, BY THE PROCESSOR, A REPEATER GAIN FOR UPLINK POWER CONTROL ACCORDING TO THE FIRST COMPENSATION VALUE AND THE SECOND COMPENSATION VALUE
430

---

FORWARD, BY THE PROCESSOR, A RADIO SIGNAL FROM THE UE TO THE NETWORK NODE ACCORDING TO THE REPEATER GAIN
440

METHOD AND APPARATUS FOR REPEATER GAIN CONTROL FOR DEVICE COLLABORATION IN DISTRIBUTED MULTIPLE-INPUT MULTIPLE-OUTPUT SYSTEMS

CROSS REFERENCE TO RELATED PATENT APPLICATION(S)

The present disclosure is part of a non-provisional application claiming the priority benefit of U.S. Patent Application No. 63/480,322, filed 18 Jan. 2023, the content of which herein being incorporated by reference in its entirety.

TECHNICAL FIELD

The present disclosure is generally related to mobile communications and, more particularly, to repeater gain control for device collaboration in distributed multiple-input multiple-output (MIMO) systems.

BACKGROUND

Unless otherwise indicated herein, approaches described in this section are not prior art to the claims listed below and are not admitted as prior art by inclusion in this section.

To counteract the large path and penetration losses in mobile communications, repeater is introduced in $3^{rd}$ Generation Partnership Project (3GPP) to extend coverage for $5^{th}$ Generation (5G) New Radio (NR) networks. In general, a repeater with compatibility of legacy user equipment and lower cost of deployment is used to amplify radio signals and forward the amplified signals from a base station (BS) to a user equipment (UE) (or vice versa). However, the details of introducing repeater in 5G NR networks have not been fully discussed yet and some issues need to be solved. One of the issues relates to repeater gain control for device collaboration in distributed MIMO systems where the BS may receive radio signals from both the UE and the repeater via distributed high-rank MIMO transmitter/receiver. Therefore, there is a need for a solution of repeater gain control for device collaboration in distributed MIMO systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issue pertaining to repeater gain control for device collaboration in distributed MIMO systems.

In one aspect, a method may involve an apparatus determining a first compensation value for a first path loss on a first link between the apparatus and a UE. The method may also involve the apparatus determining a second compensation value for a second path loss on a second link between the apparatus and a network node of a wireless network. The method may also involve the apparatus determining a repeater gain for uplink power control according to the first compensation value and the second compensation value.

The method may further involve the apparatus forwarding a radio signal from the UE to the network node according to the repeater gain.

In another aspect, an apparatus may comprise a transceiver which, during operation, wirelessly communicates with a UE and a network node of a wireless network. The apparatus may also comprise a processor communicatively coupled to the transceiver. The processor, during operation, may perform operations comprising determining a first compensation value for a first path loss on a first link between the apparatus and the UE. The processor may also perform operations comprising determining a second compensation value for a second path loss on a second link between the apparatus and the network node. The processor may also perform operations comprising determining a repeater gain for uplink power control according to the first compensation value and the second compensation value. The processor may further perform operations comprising forwarding, via the transceiver, a radio signal from the UE to the network node according to the repeater gain.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IOT) and Narrow Band Internet of Things (NB-IOT), Industrial Internet of Things (IIoT), beyond 5G (B5G), and 6th Generation (6G), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a diagram depicting an example scenario of repeater gain control for device collaboration in distributed MIMO systems under schemes in accordance with implementations of the present disclosure.

FIG. 4 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to repeater gain control for device collaboration in distributed MIMO systems. According to the present disclosure, a number of possible solutions may be implemented separately or jointly. That is, although these possible solutions may be described below separately, two or more of these possible solutions may be implemented in one combination or another.

Figure 1:
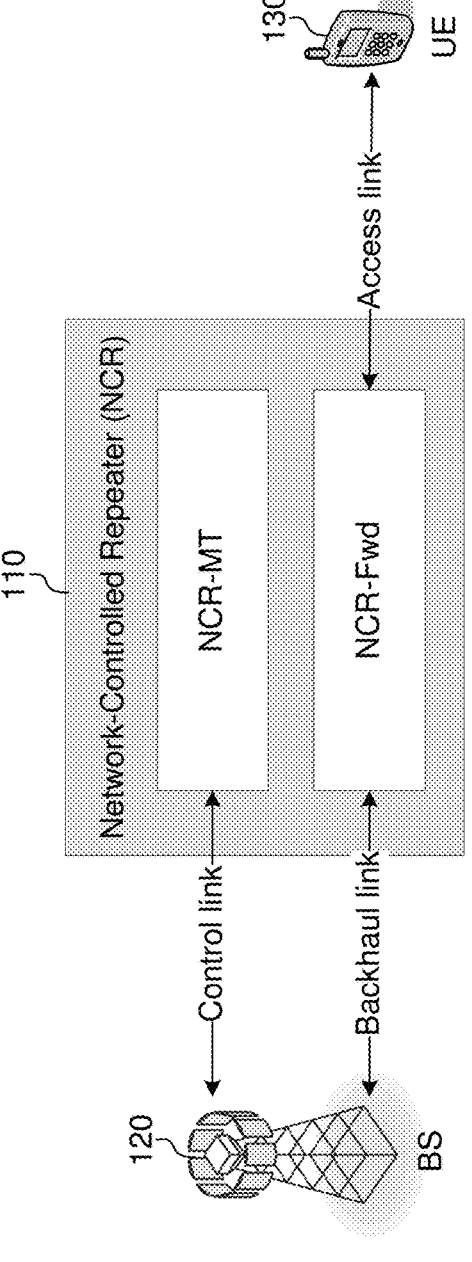
FIG. 1 is a diagram depicting an example scenario of the framework for network-controlled repeater (NCR) under schemes in accordance with an implementation of the present disclosure.

FIG. 1 illustrates an example scenario 100 of the framework for NCR under schemes in accordance with an implementation of the present disclosure. In scenario 100, an NCR 110 is located/deployed between a BS 120 (e.g., an evolved Node-B (eNB), a Next Generation Node-B (gNB), or a transmission/reception point (TRP)) and a UE 130, and is responsible for amplifying/decoding and forwarding radio signals therebetween. The NCR 110 at least includes two function entities, such as the NCR-mobile termination (MT) entity and the NCR-forwarding (Fwd) entity. The NCR-MT entity is responsible for communicating with the BS 120 via a control link (or called C-link) to enable information (e.g., side control information) exchange. The C-link may be based on the NR Uu interface. The NCR-Fwd entity is responsible for performing the amplify-and-forwarding (or decode-and-forwarding) of downlink (DL) or uplink (UL) radio signals between the BS 120 and the UE 130 via the backhaul link (or called B-link) and the access link (or called A-link). The operations of the NCR-Fwd entity may be controlled according to the received side control information from the BS 120. It is noteworthy that any wireless device capable of providing the aforementioned functionalities may also serve as a repeater. For instance, a customer premise equipment (CPE) may implement the aforementioned functionalities to serve as a repeater, or a reconfigurable intelligent surface (RIS) may implement the forwarding functionality by reflecting received signals, or a UE may serve as a repeater in peer-to-peer communications, e.g., sidelink (SL) communications. Alternatively, a repeater may also receive control signaling from a UE, i.e., the repeater-type wireless device under the schemes of the present disclosure is not limited to how it receives control signaling.

In current 5G NR (e.g., compliant with 3GPP Release 18), it only had been discussed that a repeater may serve as a relay to amplify radio signals and forward the amplified signals from a gNB to a UE (or vice versa). However, details regarding repeater gain control for device collaboration in distributed MIMO systems are not defined yet. Therefore, there is a need for a solution of repeater gain control for device collaboration in distributed MIMO systems to solve the aforementioned issue.

In view of the above, the present disclosure proposes a number of schemes pertaining to repeater gain control for device collaboration in distributed MIMO systems. According to the schemes of the present disclosure, the repeater gain for uplink power control can be derived based on at least two compensation values, including a first compensation value for a first path loss on the link between the repeater and the UE, and a second compensation value for a second path loss on the link between the repeater and the BS. Additionally, or optionally, in the case where the target power levels at the repeater's receiver end and the BS' receiver end are different, the repeater gain for uplink power control can be derived based on one more parameter, i.e., the difference between the target power level for the BS' reception (Rx) over the direct link (i.e., the link between the UE and the BS) and the target power level for the repeater's Rx over the indirect link (i.e., the link between the UE and the repeater). Accordingly, by applying the schemes of the present disclosure, the repeater may apply the repeater gain to determine the power for uplink transmission in distributed MIMO systems.

FIG. 2 illustrates an example scenario 200 of repeater gain control for device collaboration in distributed MIMO systems under schemes in accordance with implementations of the present disclosure. Scenario 200 involves at least a repeater 210 (or other repeater-type wireless device, such as a CEP, an RIS, or a UE), a BS 220 (e.g., an eNB, a gNB, or a TRP), and a UE 230 (e.g., a smartphone, a smartwatch, a personal digital assistant, a digital camera, a computing equipment such as a tablet computer, a laptop computer or a notebook computer, or a machine type apparatus such as an a smart thermostat, a smart fridge, a smart door lock, a wireless speaker or a home control center). The repeater 210 and the BS 220 may be a part of a wireless network (e.g., an LTE network, a 5G NR network, an IoT network, or a 6G network). Part (A) of FIG. 2 shows the repeater gain control for device collaboration in a distributed MIMO system with only one master UE (i.e., UE 230), while Part (B) of FIG. 2 shows the repeater gain control for device collaboration in a distributed MIMO system with multiple repeaters and master UEs (i.e., UE 230-$a$, 230-$b$, and 230-$c$). In the distributed MIMO systems, the uplink transmission over the direct link (i.e., the link between a UE and the BS or the link between the repeater and the BS) is performed using the first set of time-frequency resources, denoted as $(f, t)_1$, and the uplink transmission over the indirect link (i.e., the link between a UE and the repeater) is performed using the (k+1)-th set of time-frequency resources, denoted as $(f, t)_{2,k}$, where k is the index of the corresponding repeater (or called a slave MT). The sets of time-frequency resources $(f, t)_{2,k=1\sim M}$ are orthogonal to (or non-overlapping with) each other. One or more of the sets of time-frequency resources $(f, t)_{2,k=1\sim M}$ is/are orthogonal to (or non-overlapping with) the first set of time-frequency resources $(f, t)_1$. For instance, $(f, t)_1$ and $(f, t)_{2,k}$ are non-overlapping component carriers. Specifically, a master UE (e.g., with 4Tx capability) transmits radio signal in both $(f, t)_1$ and $(f, t)_{2,k}$, and a repeater (e.g., with 4Tx/Rx capability) receives the radio signals from the master UE in $(f, t)_{2,k}$ and amplifies and forwards the received radio signals to the BS in $(f, t)_1$, such that the BS (e.g., with 8Rx capability) may receive both the radio signals from the UE and the repeater in $(f, t)_1$. More specifically, during operation, the repeater needs to determine the repeater gain used to compensate the path loss on the indirect link.

Under a first proposed scheme in accordance with the present disclosure, the repeater gain may be determined according to two compensation values, including the first compensation value for the first path loss on the indirect link, and the second compensation value for the second path loss on the direct link. Specifically, the first compensation value is used to compensate the remaining first-hop path loss that is uncompensated by the UE's Tx power in $(f, t)_{2,k}$ (e.g., CC2), while the second compensation value is used to compensate the second-hop path loss in(f, t)$_1$ (e.g., CC1). In an example, the repeater gain may be formulated as follows:

$$rpGain\_1 =$$
$$((1 - tpcAlpha_{1stHop}) \times 1^{st} hop\, PL) + (tpcAlpha_{direct} \times 2^{nd} hop\, PL),$$

where tpcAlpha$_{1stHop}$ is the uplink power control compensation factor for the first hop (i.e., the indirect link), $1^{st}$ hop PL is the path loss on the indirect link, tpcAlpha$_{direct}$ is the uplink power control compensation factor for the second hop (i.e., the direct link), and $2^{nd}$ hop PL is the path loss on the direct link between the repeater and the BS. Accordingly, the repeater may determine the transmission power for the second-hop transmission as follows:

$$TxPower = rpGain\_1 \times InputPower,$$

where InputPower is the received power level at the repeater's receiver end.

Under a second proposed scheme in accordance with the present disclosure, considering that the target power levels at the repeater's receiver end and the BS' receiver end may be different, the repeater gain may be determined according to the two aforementioned compensation values and the difference between the target power levels. In an example, the repeater gain may be formulated as follows:

$$rpGain\_2 = ((1 - tpcAlpha_{1stHop}) \times 1^{st} hop\, PL) +$$
$$(tpcAlpha_{direct} \times 2^{nd} hop\, PL + (p0_{direct} - p0_{local}),$$

where p0$_{direct}$ is the target power level for the BS over the direct link, and p0$_{local}$ is the target power level for the repeater over the indirect link. The target power levels for the BS and the repeater may be configured by the BS. Accordingly, the repeater may determine the transmission power for the second-hop transmission as follows:

$$TxPower = rpGain\_2 \times InputPower,$$

where InputPower is the received power level at the repeater's receiver end.

In some implementations, the uplink power control compensation factor tpcAlpha$_{1stHop}$ may be configured by the BS or the UE.

In some implementations, the uplink power control compensation factor tpcAlpha$_{direct}$ may be configured by the BS.

In some implementations, the path loss on the indirect link (i.e., $1^{st}$ hop PL) may be estimated/determined by measuring a reference signal (RS) (e.g., a sounding reference signal (SRS)) transmitted by the UE. In this case, the configuration of the RS may be signaled to the repeater by the UE or the BS, such that the repeater may know where to measure the RS. Likewise, the path loss on the direct link (i.e., $2^{nd}$ hop PL) may be estimated/determined by measuring an RS transmitted by the BS, and the configuration of the RS may be signaled to the repeater by the BS.

In some implementations, the UE may measure the path loss based on an RS that is transmitted by the BS and forwarded by the repeater, to estimate/determine the end-to-end path loss (i.e., $1^{st}$ hop PL+$2^{nd}$ hop PL), and report the end-to-end path loss to the repeater. For instance, the reporting of the end-to-end path loss may be performed via an interface other than the Uu interface (i.e., the air interface between UE and BS in 5G NR or 4G LTE), such as SL or Wireless-Fidelity (Wi-Fi) interface. In addition, the repeater may estimate/determine the path loss on the direct link (i.e., $2^{nd}$ hop PL) by measuring the RS transmitted by the BS. As such, the repeater may determine/derive the path loss on the indirect link (i.e., $1^{st}$ hop PL) by subtracting $2^{nd}$ hop PL from $1^{st}$ hop PL+$2^{nd}$ hop PL.

Illustrative Implementations

Figure 3:
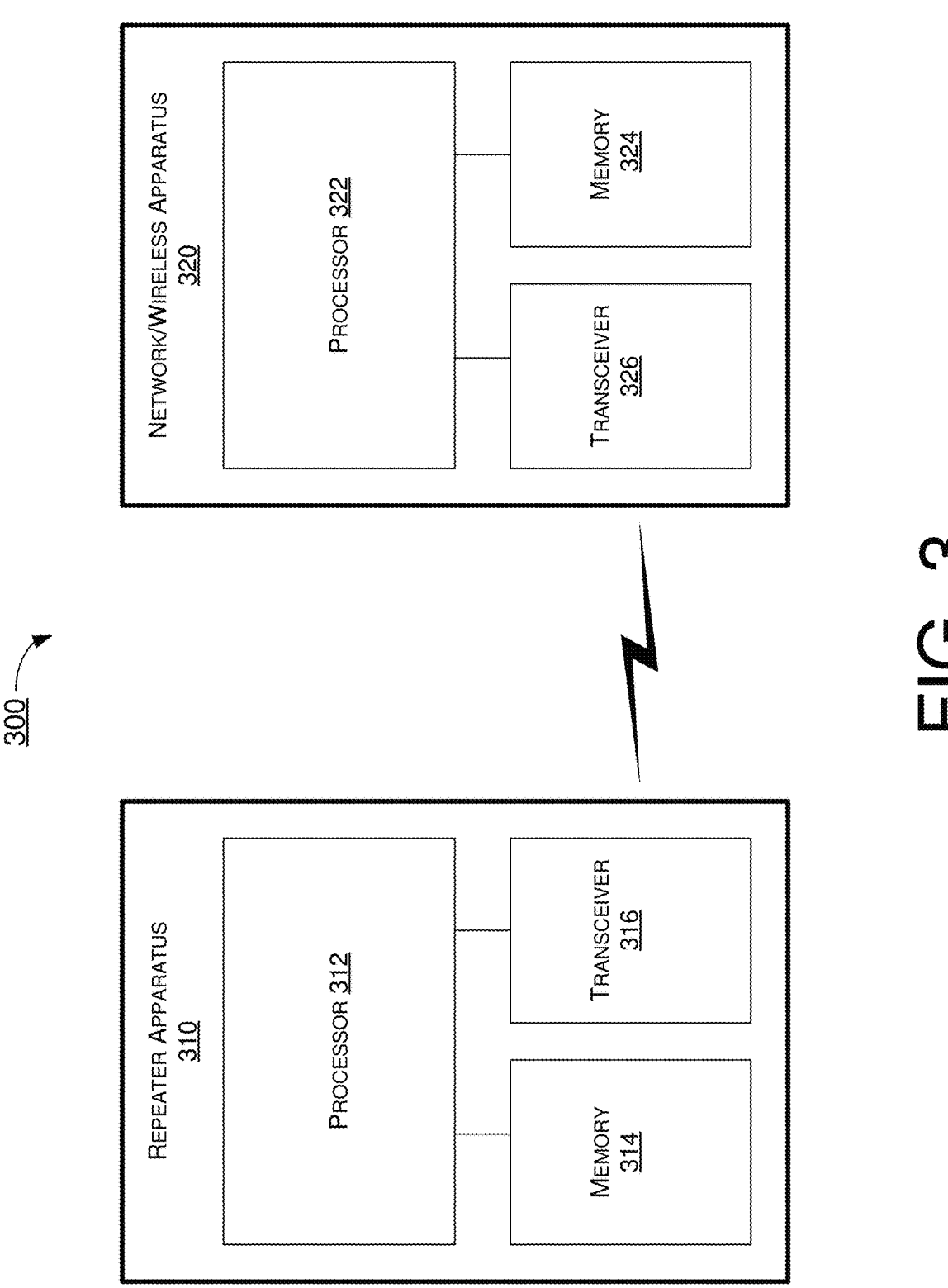
FIG. 3 is a diagram depicting an example communication system in accordance with an implementation of the present disclosure.

FIG. 3 illustrates an example communication system 300 having an example apparatus 310 and an example apparatus 320 in accordance with an implementation of the present disclosure. Each of apparatus 310 and apparatus 320 may perform various functions to implement schemes, techniques, processes and methods described herein pertaining to repeater gain control for device collaboration in distributed MIMO systems, including scenarios/schemes described above as well as process 400 described below.

Apparatus 310 may be a part of an electronic apparatus, a wireless communication apparatus, or a computing apparatus, which may be a repeater-type device, such as an NCR, a CPE, a RIS, or a UE, for amplifying and forwarding radio signals between a network node and a UE. Alternatively, apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Apparatus 310 may include at least some of those components shown in FIG. 3 such as a processor 312, for example. Apparatus 310 may further include one or more other components not pertinent to the proposed scheme of the present disclosure (e.g., internal power supply, display device and/or user interface device), and, thus, such component(s) of apparatus 310 are neither shown in FIG. 3 nor described below in the interest of simplicity and brevity.

Apparatus 320 may be a part of a network apparatus, which may be a network node, such as a BS, a small cell, a router, or a gateway, or may be a part of a wireless apparatus, which may be a UE. For instance, apparatus 320 may be a network node implemented in an eNodeB in an LTE, LTE-Advanced or LTE-Advanced Pro network or in a gNB/TRP in a 5G, NR, IoT, NB-IOT or IIoT network. Apparatus 320 may be a UE implemented in a smartphone, a smartwatch, a personal digital assistant, a digital camera, a computing equipment such as a tablet computer, a laptop computer or a notebook computer, or a machine type apparatus such as a smart thermostat, a smart fridge, a smart door lock, a wireless speaker or a home control center. Alternatively, apparatus 320 may be implemented in the form of one or more IC chips such as, for example and without limitation, one or more single-core processors, one or more multi-core processors, or one or more RISC or CISC processors. Apparatus 320 may include at least some of those components shown in FIG. 3 such as a processor 322, for example. Apparatus 320 may further include one or more other components not pertinent to the proposed scheme of the present disclosure (e.g., internal power supply, display device and/or user interface device), and, thus, such component(s) of apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including those pertaining to repeater gain control for device collaboration in distributed MIMO systems in accordance with various implementations of the present disclosure.

In some implementations, apparatus 310 may also include a transceiver 316 coupled to processor 312 and capable of wirelessly transmitting and receiving data. In some implementations, transceiver 316 may be capable of wirelessly communicating with different types of UEs or wireless networks of different radio access technologies (RATs). In some implementations, transceiver 316 may be equipped with a plurality of antenna ports (not shown) such as, for example, four antenna ports. That is, transceiver 316 may be equipped with multiple transmit antennas and multiple receive antennas for MIMO wireless communications. In some implementations, apparatus 320 may also include a transceiver 326 coupled to processor 322. Transceiver 326 may include a transceiver capable of wirelessly transmitting and receiving data. In some implementations, transceiver 326 may be capable of wirelessly communicating with different types of UEs or repeaters of different RATs. In some implementations, transceiver 326 may be equipped with a plurality of antenna ports (not shown) such as, for example, four antenna ports when apparatus 310 is a UE or eight antenna ports when apparatus 310 is a BS. That is, transceiver 326 may be equipped with multiple transmit antennas and multiple receive antennas for MIMO wireless communications.

In some implementations, apparatus 310 may further include a memory 314 coupled to processor 312 and capable of being accessed by processor 312 and storing data therein. In some implementations, apparatus 320 may further include a memory 324 coupled to processor 322 and capable of being accessed by processor 322 and storing data therein. Each of memory 314 and memory 324 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 314 and memory 324 may include a type of read-only memory (ROM) such as mask ROM, programmable ROM (PROM), erasable programmable ROM (EPROM) and/or electrically erasable programmable ROM (EEPROM). Alternatively, or additionally, each of memory 314 and memory 324 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 310 and apparatus 320 may be a communication entity capable of communicating with each other using various proposed schemes in accordance with the present disclosure. For illustrative purposes and without limitation, a description of capabilities of apparatus 310, as a repeater (e.g., NCR/CPE/RIS/UE), and apparatus 320, as a network node (e.g., BS) or a UE, is provided below.

Under certain proposed schemes in accordance with the present disclosure with respect to repeater gain control for device collaboration in distributed MIMO systems, processor 312 of apparatus 310, implemented in or as a repeater, may determine a first compensation value for a first path loss on a first link between apparatus 310 and a UE. Also, processor 312 may determine a second compensation value for a second path loss on a second link between apparatus 310 and a network node of a wireless network. Then, processor 312 may determine a repeater gain for uplink power control according to the first compensation value and the second compensation value. Additionally, processor 312 may forward, via transceiver 316, a radio signal from the UE to the network node according to the repeater gain.

In some implementations, processor 312 may also determine a difference between a first target power level and a second target power level. Specifically, the first target power level is configured for the network node to receive radio signals on a direct link between the UE and the network node, and the second target power level is configured for apparatus 310 to receive radio signals on the first link. Additionally, the determining of the repeater gain for uplink power control may be performed further according to the difference.

In some implementations, the repeater gain for uplink power control may be determined as a sum of the difference, the first compensation value, and the second compensation value.

In some implementations, the determining of the first compensation value may include: determining whether the first path loss is fully compensated by the UE according to a first uplink power control compensation factor for the first link; determining that the first compensation value is zero when the first path loss is fully compensated by the UE; and determining the first compensation value according to the first uplink power control compensation factor and the first path loss when the first path loss is partially compensated by the UE.

In some implementations, the first uplink power control compensation factor may be configured by the network node or the UE.

In some implementations, processor 312 may also measure, via transceiver 316, an RS transmitted by the UE, and determine the first path loss based on the RS measurement.

In some implementations, processor 312 may also measure, via transceiver 316, an RS transmitted by the network node, and determine the second path loss based on the RS measurement.

In some implementations, processor 312 may also receive, via transceiver 316, a report of an end-to-end path loss from the UE. Specifically, the end-to-end path loss is determined, by the UE, based on the RS transmitted by the network node and forwarded by apparatus 310 to the UE. The UE may report the determined end-to-end path loss to the apparatus 310. Additionally, processor 312 may determine the first path loss according to the end-to-end path loss and the second path loss.

9

10

In some implementations, the determining of the second compensation value may be performed according to the second path loss and a second uplink power control compensation factor for the second link.

In some implementations, the second uplink power control compensation factor may be configured by the network node.

Illustrative Processes

FIG. 4 illustrates an example process 400 in accordance with an implementation of the present disclosure. Process 400 may represent an aspect of implementing various proposed designs, concepts, schemes, systems and methods described above, whether partially or entirely, including those described above. More specifically, process 400 may represent an aspect of the proposed concepts and schemes pertaining to repeater gain control for device collaboration in distributed MIMO systems. Process 400 may include one or more operations, actions, or functions as illustrated by one or more of blocks 410 to 440. Although illustrated as discrete blocks, various blocks of process 400 may be divided into additional blocks, combined into fewer blocks, or eliminated, depending on the desired implementation. Moreover, the blocks/sub-blocks of process 400 may be executed in the order shown in FIG. 4 or, alternatively in a different order. Furthermore, one or more of the blocks/sub-blocks of process 400 may be executed iteratively. Process 400 may be implemented by or in apparatus 310 as well as any variations thereof. Solely for illustrative purposes and without limiting the scope, process 400 is described below in the context of apparatus 310 as a repeater. Process 400 may begin at block 410.

At 410, process 400 may involve processor 312 of apparatus 310, implemented in or as a repeater, determining a first compensation value for a first path loss on a first link between apparatus 310 and a UE. Process 400 may proceed from 410 to 420.

At 420, process 400 may involve processor 312 determining a second compensation value for a second path loss on a second link between apparatus 310 and a network node of a wireless network. Process 400 may proceed from 420 to 430.

At 430, process 400 may involve processor 312 determining a repeater gain for uplink power control according to the first compensation value and the second compensation value. Process 400 may proceed from 430 to 440.

At 440, process 400 may involve processor 312 forwarding, via transceiver 316, a radio signal from the UE to the network node according to the repeater gain.

In some implementations, process 400 may further involve processor 312 determining a difference between a first target power level and a second target power level. Specifically, the first target power level is configured for the network node to receive radio signals on a direct link between the UE and the network node, and the second target power level is configured for apparatus 310 to receive radio signals on the first link. Additionally, the determining of the repeater gain for uplink power control may be performed further according to the difference.

In some implementations, the repeater gain for uplink power control may be determined as a sum of the difference, the first compensation value, and the second compensation value.

In some implementations, the determining of the first compensation value may include: determining whether the first path loss is fully compensated by the UE according to a first uplink power control compensation factor for the first link; determining that the first compensation value is zero when the first path loss is fully compensated by the UE; and determining the first compensation value according to the first uplink power control compensation factor and the first path loss when the first path loss is partially compensated by the UE.

In some implementations, the first uplink power control compensation factor may be configured by the network node or the UE.

In some implementations, process 400 may further involve processor 312 measuring, via transceiver 316, an RS transmitted by the UE, and determining the first path loss based on the RS measurement.

In some implementations, process 400 may further involve processor 312 measuring, via transceiver 316, an RS transmitted by the network node, and determining the second path loss based on the RS measurement.

In some implementations, process 400 may further involve processor 312 receiving, via transceiver 316, a report of an end-to-end path loss from the UE. Specifically, the end-to-end path loss is determined, by the UE, based on the RS transmitted by the network node and forwarded by apparatus 310 to the UE. The UE may report the determined end-to-end path loss to the apparatus 310. Additionally, process 400 may further involve processor determining the first path loss according to the end-to-end path loss and the second path loss.

In some implementations, the determining of the second compensation value may be performed according to the second path loss and a second uplink power control compensation factor for the second link.

In some implementations, the second uplink power control compensation factor may be configured by the network node.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

determining, by a processor of an apparatus, a first compensation value for a first path loss on a first link between the apparatus and a user equipment (UE);

determining, by the processor, a second compensation value for a second path loss on a second link between the apparatus and a network node of a wireless network;

determining, by the processor, a repeater gain for uplink power control according to the first compensation value and the second compensation value; and forwarding, by the processor, a radio signal from the UE to the network node according to the repeater gain.

2. The method of claim 1, further comprising:

determining, by the processor, a difference between a first target power level and a second target power level, wherein the first target power level is configured for the network node to receive radio signals on a direct link between the UE and the network node, and the second target power level is configured for the apparatus to receive radio signals on the first link; and wherein the determining of the repeater gain for uplink power control is performed further according to the difference.

3. The method of claim 2, wherein the repeater gain for uplink power control is determined as a sum of the difference, the first compensation value, and the second compensation value.

4. The method of claim 1, wherein the determining of the first compensation value comprises:

determining whether the first path loss is fully compensated by the UE according to a first uplink power control compensation factor for the first link;

determining that the first compensation value is zero when the first path loss is fully compensated by the UE; and determining the first compensation value according to the first uplink power control compensation factor and the first path loss when the first path loss is partially compensated by the UE.

5. The method of claim 4, wherein the first uplink power control compensation factor is configured by the network node or the UE.

6. The method of claim 1, further comprising:

measuring, by the processor, a reference signal (RS) transmitted by the UE; and determining, by the processor, the first path loss based on the RS measurement.

7. The method of claim 1, further comprising:

measuring, by the processor, a reference signal (RS) transmitted by the network node; and determining, by the processor, the second path loss based on the RS measurement.

8. The method of claim 7, further comprising:

receiving, by the processor, a report of an end-to-end path loss from the UE, wherein the end-to-end path loss is determined based on the RS transmitted by the network node and forwarded by the apparatus to the UE; and determining, by the processor, the first path loss according to the end-to-end path loss and the second path loss.

9. The method of claim 1, wherein the determining of the second compensation value is performed according to the second path loss and a second uplink power control compensation factor for the second link.

10. The method of claim 9, wherein the second uplink power control compensation factor is configured by the network node.

11. An apparatus, comprising:

a transceiver which, during operation, wirelessly communicates with a user equipment (UE) and a network node of a wireless network; and a processor communicatively coupled to the transceiver such that, during operation, the processor performs operations comprising:

determining a first compensation value for a first path loss on a first link between the apparatus and the UE;

determining a second compensation value for a second path loss on a second link between the apparatus and the network node;

determining a repeater gain for uplink power control according to the first compensation value and the second compensation value; and forwarding, via the transceiver, a radio signal from the UE to the network node according to the repeater gain.

12. The apparatus of claim 11, wherein, during operation, the processor further performs operations comprising:

determining a difference between a first target power level and a second target power level, wherein the first target power level is configured for the network node to receive radio signals on a direct link between the UE and the network node, and the second target power level is configured for the apparatus to receive radio signals on the first link; and wherein the determining of the repeater gain for uplink power control is performed further according to the difference.

13. The apparatus of claim 12, wherein the repeater gain for uplink power control is determined as a sum of the difference, the first compensation value, and the second compensation value.

14. The apparatus of claim 11, wherein the determining of the first compensation value comprises:

determining whether the first path loss is fully compensated by the UE according to a first uplink power control compensation factor for the first link;

determining that the first compensation value is zero when the first path loss is fully compensated by the UE; and determining the first compensation value according to the first uplink power control compensation factor and the first path loss when the first path loss is partially compensated by the UE.

15. The apparatus of claim 14, wherein the first uplink power control compensation factor is configured by the network node or the UE.

16. The apparatus of claim 11, wherein, during operation, the processor further performs operations comprising:

measuring, via the transceiver, a reference signal (RS) transmitted by the UE; and determining the first path loss based on the RS measurement.

17. The apparatus of claim 11, wherein, during operation, the processor further performs operations comprising:

measuring, via the transceiver, a reference signal (RS) transmitted by the network node; and determining the second path loss based on the RS measurement.

18. The apparatus of claim 17, wherein, during operation, the processor further performs operations comprising:

receiving, via the transceiver, a report of an end-to-end path loss from the UE, wherein the end-to-end path loss is determined based on the RS transmitted by the network node and forwarded by the apparatus to the UE; and determining the first path loss according to the end-to-end path loss and the second path loss.

19. The apparatus of claim 11, wherein the determining of the second compensation value is performed according to the second path loss and a second uplink power control compensation factor for the second link.

20. The apparatus of claim 19, wherein the second uplink power control compensation factor is configured by the network node.

* * * * *